United States Patent
Passe et al.

(10) Patent No.: US 10,135,832 B1
(45) Date of Patent: Nov. 20, 2018

(54) PRIVILEGED COMMUNICATION INDICATION

(71) Applicant: Securus Technologies, Inc., Dallas, TX (US)

(72) Inventors: Scott Passe, Forney, TX (US); Luke Keiser, Frisco, TX (US)

(73) Assignee: Securus Technologies, Inc., Carrollton, TX (US)

( * ) Notice: Subject to any disclaimer, the term of this patent is extended or adjusted under 35 U.S.C. 154(b) by 302 days.

(21) Appl. No.: 15/078,047

(22) Filed: Mar. 23, 2016

(51) Int. Cl.
*H04L 29/06* (2006.01)
*H04L 9/08* (2006.01)

(52) U.S. Cl.
CPC .............. *H04L 63/102* (2013.01); *H04L 9/08* (2013.01)

(58) Field of Classification Search
CPC ... H04L 63/0428; H04L 63/10; H04L 63/102; H04L 9/08; G06F 21/60–21/606; G06F 21/62
See application file for complete search history.

(56) References Cited

U.S. PATENT DOCUMENTS

2006/0224589 A1* 10/2006 Rowney ................ H04L 51/063
2011/0208960 A1* 8/2011 Flood .................... H04L 51/066
713/153

OTHER PUBLICATIONS

Kang et al., Privilege Messaging: An Authorization Framework over Email Infrastructure, 20th Large Installation System Administration Conference, 2006.*

* cited by examiner

*Primary Examiner* — Minh Dinh
(74) *Attorney, Agent, or Firm* — Fogarty LLP

(57) ABSTRACT

Systems and methods, which can provide for an indication of a privileged communication, are provided. A method, according to an embodiment, uses at least one processor of a communication server device. Addressee information of one or more addressee(s) of a communication, sender information of a sender of the communication, or a combination thereof is received. The sender information, the addressee information, or a combination thereof is compared to registered user information maintained in a database. The registered user information corresponds to registered users to or from whom privileged communications may be sent or received. An indication that the communication is privileged is provided when the sender information, the addressee information, or the combination thereof corresponds to respective registered user information maintained in the database.

20 Claims, 1 Drawing Sheet

PRIVILEGED COMMUNICATION INDICATION

TECHNICAL FIELD

The present disclosure relates generally to indications of privileged communications, and more particularly to providing an indication that a non-voiced (e.g., text-based) communication, such as by e-mail, text message, or the like, is a privileged communication.

BACKGROUND

By allowing prisoners to have some contact with friends and family while incarcerated, the justice system aims to facilitate their transition back into society upon release. Traditional forms of contact include telephone calls, in-person visitation, etc. More recently, technological advances have allowed jails and prisons to provide other types of visitation, including individual-to-individual videoconferences and online chat sessions.

Traditional communication services of controlled-environment facilities (such as correctional facilities) include allowing residents (e.g., inmates) to place outbound phone calls to non-residents of the controlled-environment facility. However, residents of controlled-environment facilities are typically restricted from unauthorized communications with individuals outside of the controlled-environment facility.

SUMMARY

The present disclosure is directed to systems and methods which can provide for indicating when communications are privileged, such as a communication where content of the communication can remain in a persistent state at some device due to the nature of the mode of communication. Some examples of these communications can include email, Short Message Service (SMS) text, direct message, instant messaging, or the like. In some embodiments, communication modes can be non-voice based, such as text-based messages of any format whether delivered in real-time or non-real-time.

An embodiment is a method. The method uses at least one processor of a communication server device. Addressee information of one or more addressee of a communication, sender information of a sender of the communication, or a combination thereof is received. The communication is to be transmitted by a communication mode, and the communication mode involves content of the communication being kept in a persistent state at a device due to the nature of the communication mode. The sender information, the addressee information, or a combination thereof is compared to registered user information maintained in a database. The registered user information corresponds to registered users to or from whom privileged communications may be sent or received. An indication that the communication is privileged is provided when the sender information, the addressee information, or the combination thereof corresponds to respective registered user information maintained in the database.

Another embodiment is a system. The system includes a database device, a communication client device, and a communication server device. The database device has a database stored in non-transitory memory. The database maintains registered user information of registered users to whom a privileged communication can be sent. The communication client device has a client application stored in non-transitory memory and operable on at least one processor. The client application is operable to generate an originating communication comprising content and addressee information. The communication server device has a server module stored in non-transitory memory and operable on at least one processor. The server module is operable to receive the addressee information, query the database, and compare the addressee information to the registered user information. The server module is operable to send an indication to the client application that the originating communication is privileged when the addressee information corresponds to respective registered user information in the database. The client application is further operable to attach a privilege flag to the originating communication in response to receiving the indication and to transmit the originating communication with the privilege flag.

A further embodiment is a non-transitory computer-readable storage medium having a computer program embodied thereon. The computer program includes program code instructions for receiving first addressee information of an originating communication from a client application; program code instructions for comparing the first addressee information to registered user information in a database, the registered user information corresponding to registered users with whom communication may be privileged; program code instructions for transmitting an indication that the originating communication is privileged to the client application when the first addressee information corresponds to respective registered user information in the database; and program code instructions for receiving the originating communication from the client application, the originating communication having a first privilege flag in response to the indication.

In various embodiments, one or more of the techniques described herein may be performed by one or more computer systems. In other various embodiments, a tangible, non-transitory computer-readable storage medium may have program instructions stored thereon that, upon execution by one or more computer systems, cause the one or more computer systems to execute one or more operations disclosed herein. In yet other various embodiments, one or more systems may each include at least one processor and non-transitory memory coupled to the processor(s), wherein the memory is configured to store program instructions executable by the processor(s) to cause the system(s) to execute one or more operations disclosed herein.

The foregoing has outlined rather broadly the features and technical advantages of the present disclosure in order that the detailed description that follows may be better understood. Additional features and advantages will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Figure 1:
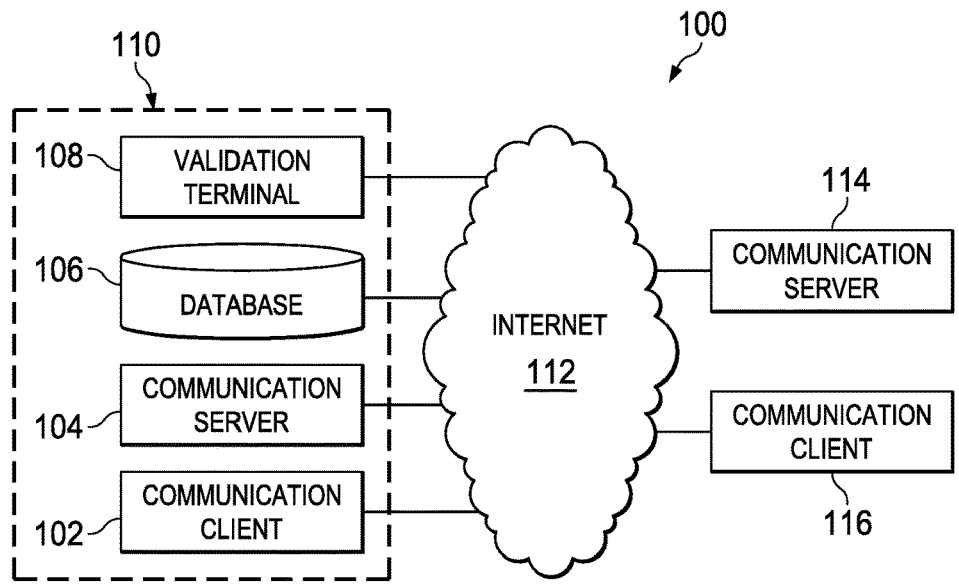

Having thus described some embodiments in general terms, reference will now be made to the accompanying drawings, which are not necessarily drawn to scale, and wherein:

FIG. 1 is a diagrammatic illustration of an example communication system in accordance with some embodiments.

Figure 2:
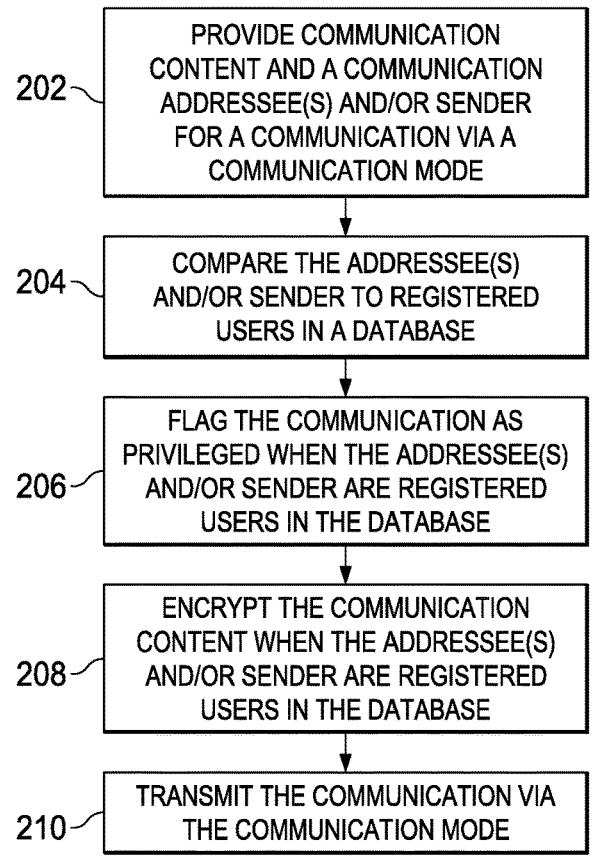

FIG. 2 is a flowchart of a process for communicating and indicating a privileged communication in accordance with some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

Some embodiments now will be described more fully hereinafter with reference to the accompanying drawings. Other embodiments may be applied in many different forms, and this disclosure should not be construed as limited to the embodiments set forth herein. Rather, the example embodiments herein are provided so that this disclosure will be thorough and complete, and will fully convey the scope of the invention to those skilled in the art. One skilled in the art may be able to use the various embodiments of the invention.

Embodiments described below are described in the context of communication environments. Various communication environments for communication modes involve content of communications remaining in persistent states at some devices due to the natures of the communication modes. Examples of these types of communication modes include non-voice communications, such as email, Short Message Service (SMS) text, direct message, instant message, or the like, although various files, such as images, video recordings, and/or audio recordings (which may include voiced communications) may be attached to such communications. Some embodiments provide safeguards for privileged communications through these communication modes, for example. Some embodiments can detect when a communication is privileged and can flag the communication so that the communication is handled differently from non-privileged communications. For example, a privileged communication may be removed from investigatory or data mining efforts to which non-privileged communications may be subject. Additionally, some embodiments can detect when a communication is privileged and can encrypt the communication as an additional level of security.

Some embodiments discussed below are discussed in the context of controlled-environment facilities. Various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. For convenience of explanation, various examples discussed herein are presented in the context of a correctional facility, or the like. It should be understood, however, that the systems and methods described herein may be similarly applicable to other types of controlled-environment facilities and their respective residents (e.g., a hospital and its patients, a school dormitory and its students, etc.). Various concepts of this disclosure, however, may be applied to other contexts.

One context in which some embodiments may be beneficial is a correctional facility, such as a jail or prison. In a correctional facility, inmates' communications may be monitored and recorded. The recorded communications may be subsequently used for investigatory purposes, data mining, or the like. However, privileged real-time communications may not be monitored and recorded, in some instances. For example, a face-to-face meeting between an inmate and his attorney is generally not recorded because such a communication is protected by attorney-client privilege. The privilege protections have not been extended to other forms of communication, particularly email communication, for inmates in a correctional facility.

Some embodiments can achieve a technical solution to avoiding processing and/or handling of a communication in a communication system, such as monitoring and recording the communication, that would defeat a privilege. Additionally, some embodiments can achieve the technical solution of removing cached copies of a communication and/or encrypting copies of the communication that are maintained in a persistent state at a device due to the nature of the communication mode to provide an additional level of security to protect privilege within the communication system.

FIG. 1 is a diagrammatic illustration of an example communication system 100 in accordance with some embodiments. The communication system 100 includes a first communication client device 102, a first communication server device 104, a database device 106, and a validation terminal device 108, each of which may be at a controlled-environment facility 110. The communication system 100 further includes a network 112, a second communication server device 114, and a second communication client device 116. The first communication client device 102, the first communication server device 104, the database device 106, the validation terminal device 108, the second communication server device 114, and the second communication client device 116 are communicatively coupled to the network 112. Although various devices are illustrated and described as being located on-site at the controlled-environment facility 110, various ones of the devices of the communication system 100 may be located on-site at a controlled-environment facility 110 while other components may be located remotely from the controlled-environment facility. Other embodiments contemplate a system independent from a controlled-environment facility.

The network 112 can be a communications and/or data network. The network 112 may include one or more networks, such as a Local Area Network (LAN), a Wide Area Network (WAN), an intranet, the Internet, or any other type of communications and/or data network suitable for allowing communication between two entities. The network 112 can comprise wired connections to devices, wireless connections to devices (including, e.g., Wi-Fi connections), or a combination thereof.

The first communication client device 102 and the second communication client device 116 can be any device capable of sending and/or receiving communications in a communication mode that involves a content of the communication remaining in a persistent state at some device due to the nature of the communication mode. For example, the sending of an email involves a transmitting server to keep the email in a persistent state after the application that sent the email has terminated and until a receiving server acknowledges receipt of the email. Even further, the receiving server generally keeps the email in a persistent state until accessed by a receiving application. However, for example, a telephone call generally, outside of controlled environment facility situations does not involve keeping the voiced communication in a persistent state because the telephone call is a real-time connection and communication. In some instances, the content of a telephone call may be recorded, but this recording may be due to some other factor and not due to the nature of the telephone call. Some examples of communication modes that involve content remaining in a persistent state at a device due to the nature of the respective communications modes are email, SMS text, direct message, instant message, or the like. Generally, these communication modes are non-voiced communications, e.g., are text-based communications, although various files, such as image files, video files, audio files, or the like, may be attached to the communication.

The first communication client device 102 can be a computer, a smartphone, a tablet, a kiosk, or the like. The first communication client device 102 can execute a client application for transmitting and receiving communications through the network 112. Similarly, the second communication client device 116 can be a computer, a smartphone, a tablet, a kiosk, or the like. The second communication client device 116 can execute a client application for transmitting and receiving communications through the network 112.

Each of the first communication client device 102 and the second communication client device 116 can include one or more processor(s) such as a central processing unit (CPU), system memory, one or more input/output (I/O) interface(s) coupled to a respective peripheral device, and a network interface card coupled together by one or more bus(es). In various embodiments, the communication client devices 102 and 116 may each be a single-processor system having one processor, or a multi-processor system including two or more processors (e.g., two, four, eight, or another suitable number). Processor(s) may be any processor capable of executing program instructions. For example, in various embodiments, processor(s) may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors may commonly, but not necessarily, implement the same ISA.

System memory of the respective communication client devices 102 and 116 may be configured to store program instructions and/or data accessible by respective processor(s) of the communication client devices 102 and 116. In various embodiments, system memory may be implemented using any suitable tangible or non-transitory memory medium, such as static random access memory (SRAM), synchronous dynamic RAM (SDRAM), nonvolatile/Flash-type memory, or any other type of memory. Program instructions and data implementing certain operations may be stored within system memory as program instructions and data storage, respectively. In other embodiments, program instructions and/or data may be received, sent, or stored upon different types of computer-accessible media or on similar media separate from system memory or the respective communication client devices 102 and 116. Generally speaking, a computer-readable medium may include any tangible or non-transitory storage media or memory media such as magnetic or optical media—e.g., disk or CD/DVD-ROM coupled to the respective communication client devices 102 and 116 via an I/O interface, flash memory, random access memory (RAM), etc. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via a network interface card.

System memory may include program instructions, which may be configured to implement certain embodiments described herein, and data storage comprising various data accessible when program instructions are operated. In an embodiment, program instructions may include software elements corresponding to one or more of the various embodiments illustrated herein. For example, program instructions may be implemented in various embodiments using any desired programming language, scripting language, or combination of programming languages and/or scripting languages (e.g., C, C++, C#, JAVA®, JAVASCRIPT®, PERL®, etc.). Data storage may include data that may be used in these embodiments. In other embodiments, other or different software elements and data may be included.

The client application of each of the communication client devices 102 and 116 may include program code instructions stored on the respective system memory or other tangible, non-transitory memory that when operated on the respective processor(s) performs one or more specific tasks, such as tasks described below. The client application can include additional sub-modules and/or one or more routines. In some embodiments, the client application is a web browser for accessing a web-based communication system. In some embodiments, the client application is a stand-alone application operating on the respective communication client devices 102 and 116. The client application can be proprietary, open source, or a combination thereof.

I/O interface(s) of the communication client devices 102 and 116 may be configured to coordinate I/O traffic between processor(s) and memory of the respective communication client devices 102 and 116, and any peripheral devices, including network interface card(s) or other peripheral interfaces, such as a keyboard, a mouse, a display including a touchscreen, a microphone, a speaker, or the like. In some embodiments, I/O interface(s) may perform any suitable protocol, timing or other data transformations to convert data signals from one component (e.g., a peripheral device) into a format usable by another component (e.g., processor(s)). In some embodiments, I/O interface(s) may include support for devices attached through various types of peripheral buses, such as a variant of the Peripheral Component Interconnect (PCI) bus standard or the Universal Serial Bus (USB) standard, for example. In some embodiments, the function of I/O interface(s) may be split into two or more separate components, such as a north bridge and a south bridge, for example. In addition, in some embodiments, some or all of the functionality of I/O interface(s), such as an interface to memory, may be incorporated into processor(s).

Network interface cards of the communication client devices 102 and 116 may be configured to allow data to be exchanged between the respective communication client devices 102 and 116 and another device directly attached to the respective communication client devices 102 and 116 or other devices attached to a network (e.g., network 112), such as other computer systems, such as server devices. In various embodiments, network interface cards may support communication via wired and/or wireless general data networks, such as any suitable type of Ethernet network, for example; via telecommunications/telephony networks such as analog voice networks or digital fiber communications networks; via storage area networks such as Fibre Channel Storage Area Networks (SANs), or via any other suitable type of network and/or protocol.

The first communication server device 104 and the second communication server device 114 each operate a communication server module and can each be any computing system for enabling communications, such as by transmitting and receiving communications through the network 112. Each of the communication server devices 104 and 114 can include one or more processor(s) such as a CPU, system memory, and a network interface card coupled together by one or more bus(es).

In various embodiments, the communication server devices 104 and 114 may each be a single-processor system having one processor, or a multi-processor system including two or more processors (e.g., two, four, eight, or another suitable number). Processor(s) may be any processor capable of executing program instructions. For example, in various embodiments, processor(s) may be general-purpose or embedded processors implementing any of a variety of ISAs, such as the x86, POWERPC®, ARM®, SPARC®, or MIPS® ISAs, or any other suitable ISA. In multi-processor systems, each of processors may commonly, but not necessarily, implement the same ISA.

System memory of the respective communication server devices 104 and 114 may be configured to store program instructions and/or data accessible by respective processor(s) of the communication server devices 104 and 114. In various embodiments, system memory may be implemented using any suitable tangible or non-transitory memory medium, such as SRAM, SDRAM, nonvolatile/Flash-type memory, or any other type of memory. Program instructions and data implementing certain operations may be stored within system memory as program instructions and data storage, respectively. In other embodiments, program instructions and/or data may be received, sent, or stored upon different types of computer-accessible media or on similar media separate from system memory or the communication server devices 104 and 114. Generally speaking, a computer-readable medium may include any tangible or non-transitory storage media or memory media such as magnetic or optical media—e.g., disk or CD/DVD-ROM coupled to the respective communication server devices 104 and 114 via an I/O interface, flash memory, RAM, etc. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via a network interface card.

System memory of the respective communication server devices 104 and 114 may include program instructions, configured to implement certain embodiments described herein, and data storage comprising various data accessible when program instructions are operated. In an embodiment, program instructions may include software elements corresponding to one or more of the various embodiments illustrated herein. For example, program instructions may be implemented in various embodiments using any desired programming language, scripting language, or combination of programming languages and/or scripting languages (e.g., C, C++, C#, JAVA®, JAVASCRIPT®, PERL®, etc.). Data storage may include data that may be used in these embodiments. In other embodiments, other or different software elements and data may be included.

The communication server module of each of the communication server devices 104 and 114 may include program code instructions stored on the respective system memory or other tangible, non-transitory memory that when operated on the respective processor(s) performs one or more specific tasks, such as tasks described below. The communication server module can include additional sub-modules and/or one or more routines. In some embodiments, the communication server module provides a portal to a client, such as through a web browser. In some embodiments, the communication server module operates with a stand-alone client operating on a communication client device. The communication server module can be proprietary, open source, or a combination thereof.

Network interface card(s) of the respective communication server devices 104 and 114 may be configured to allow data to be exchanged between the respective communication server devices 104 and 114 and another device directly attached to the communication server devices 104 and 114 or other devices attached to a network (e.g., network 112), such as other computer systems, such as a server device. In various embodiments, network interface card(s) may support communication via wired and/or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

The database device 106 can maintain a database of registered users to whom communications, e.g., through the first communication client device 102 and the first communication server device 104, may be privileged. For example, the database device 106 can maintain a database of attorneys (for attorney-client privilege), clergy (for priest-penitent privilege), doctors (for physician-patient privilege), respective spouses (for spousal privilege), or the like to whom communication may be privileged. The database can maintain addresses and/or numbers of the individuals to whom communication may be privileged. For example, email addresses of attorneys can be registered for privileged communication through email. The validation terminal device 108 can be, for example, a desktop computer, a laptop computer, a tablet, a smartphone, or the like that can be used to validate information of registered users in the database.

The database device 106 operates a database with an appropriate database management system (DBMS). The database device 106 can include one or more processor(s)

for operating the DBMS, system memory for storing program instructions of the DBMS, and database memory for storing the database.

Processor(s) in the database device 106 may be any processor capable of executing program instructions. For example, in various embodiments, processor(s) may be general-purpose or embedded processors implementing any of a variety of ISAs, such as the x86, POWERPC®, ARM®, SPARC®, or MIPS® ISAs, or any other suitable ISA. In multi-processor systems, each of processors may commonly, but not necessarily, implement the same ISA. System memory of the database device may be configured to store program instructions and/or data accessible by processor. In various embodiments, system memory may be implemented using any suitable tangible or non-transitory memory medium. As illustrated, program instructions and data implementing certain operations, such as, for example, the DBMS, may be stored within system memory as program instructions and data storage, respectively. In other embodiments, program instructions and/or data may be received, sent or stored upon different types of computer-accessible media or on similar media separate from system memory or the database device 106. Generally speaking, a computer-readable medium may include any tangible or non-transitory storage media or memory media.

The DBMS may be structured query language (SQL)-based, IBM DB2, or the like. The database can be stored in any acceptable memory technology, such as redundant array of independent disks (RAID) or the like.

A person of ordinary skill in the art will appreciate that computer systems (e.g., the communication client devices 102 and 116, communication server devices 104 and 114, database device 106, and/or validation terminal device 108) are merely illustrative and are not intended to limit the scope of the disclosure described herein. In particular, the computer systems and devices may include any combination of hardware or software that can perform the indicated operations. Additionally, the operations performed by the illustrated components may, in some embodiments, be performed by fewer components or distributed across additional components, which components may be in any location. Similarly, in other embodiments, the operations of some of the illustrated components may not be provided and/or other additional operations may be available. Accordingly, systems and methods described herein may be implemented or executed with other computer system configurations.

FIG. 2 illustrates a flowchart of a process for communicating and indicating a privileged communication in accordance with some embodiments. The method of FIG. 2 is discussed below as operating in the context of the system of FIG. 1, as illustrated. One of ordinary skill in the art will readily understand that the method of FIG. 2 may operate in other environments and systems, such as in modifications of FIG. 1 discussed above or other environments and systems. FIG. 2 is first described in the context of a communication originating at the first communication client device 102 of FIG. 1, and then is described in the context of receiving a communication at the first communication client device 102 of FIG. 1.

A database of registered users is provided in the operation of the process of FIG. 2. The registered users maintained in the database may be individuals to or from whom a privileged communication may be sent or received, such as attorneys, clergy, doctors, respective spouses, or the like. The users may register with the entity that maintains the database, such as where the entity populates the database with the users' information, where the entity provides to the users access to the database such that the users may populate the database, or the like. The information that populates the database can be, for each user, for example, the user's name, the user's professional license number (such as for attorneys), contact information (such as telephone number for SMS text and email address), or the like. Additionally, the information can include a particular user with whom communication with the registered user may be privileged. For example, a registered user may be a spouse of a first user, but not a second user. Hence in this example, the registered user's information may include an indication with respect to the first user such that communication between the registered user and the first user may be indicated as privileged, but not communication between the registered user and the second user.

The entity may validate information populating the database though, e.g., a terminal to ensure that the users that are registered should properly be registered and that the provided information is correct. In the context of FIG. 1, the database on the database device 106 is populated to include the registered users' information, which may be validated using the validation terminal device 108 that may be communicatively coupled to the database device 106 through the network 112.

Turning to an example in which a communication is to be sent, in step 202, communication content and a communication addressee(s) and/or sender are provided for a communication via a communication mode. The communication mode can involve the communication content remaining in a persistent state at some device due to the nature of the communication mode, such as in email, SMS text, direct message, instant messaging, or the like. In the context of FIG. 1, a user, e.g., a resident of the controlled-environment facility 110 (like an inmate of a jail or prison), accesses the user's account for communication using the client application operating on the first communication client device 102, and composes and addresses a communication, such as an email message, SMS text, direct message, instant message, or the like, using the client application. Once the communication is ready for transmission (e.g., after the user hits "Send") but before the communication is transmitted from the first communication client device 102, the client application operating on the first communication client device 102 transmits to the communication server module operating on the first communication server device 104 the addressee(s) and the sender of the communication, e.g., through the network 112.

In step 204, the addressee(s) and/or sender of the communication are compared to the registered users in the database. In the context of FIG. 1, the communication server module queries the database operating on the database device 106, e.g., through the network 112, to determine whether the addressee(s) are registered users on the database. In some instances, the addressee(s) may be determined to be registered without reference to the sender, such as for attorneys, clergy, etc. In other instances, one or more addressee may be registered for communication with a particular user, such as if the addressee is a spouse of the sender, and hence, one or more addressee may be determined to be registered with reference to the sender. In some embodiments, if all of the addressee(s) are registered, the communication server module transmits an indication to the client application on the first communication client device 102 that the communication is privileged. In some embodiments, if not all of the addressee(s) are registered, an indication that the communication is not privileged is transmitted to the client application on the first communication client device 102.

In step 206, the communication is flagged as privileged when the addressee(s) and/or sender are registered users in the database. A flag can be attached to the communication as header information, for example, when the communication is privileged. In the context of FIG. 1, when the client application on the first communication client device 102 receives an indication that the communication is privileged, the client application attaches a privilege flag to the communication before the communication is transmitted from the client application.

In step 208, the communication content is encrypted when the addressee(s) and/or sender are registered users in the database. In the context of FIG. 1, when the client application on the first communication client device 102 receives an indication that the communication is privileged, the client application encrypts the content of the communication for additional security. The encryption may be by using, for example, the Pretty Good Privacy (PGP) protocol, Bitmessage protocol, Secure/Multipurpose Internet Mail Extensions (S/MIME) protocol, or the like. The content of the communication may be encrypted while header information of the message, including any flag, may in some instances not be encrypted. In some embodiments, encryption may be omitted.

In step 210, the communication is then transmitted via the communication mode. In the context of FIG. 1, the communication is transmitted from the client application operating on the first communication client device 102 through the network 112 to the communication server module operating on the first communication server device 104. From the communication server module operating on the first communication server device 104, the communication is transmitted to the communication server module operating on the second communication server device 114. From the communication server module operating on the second communication server device 114, the communication is transmitted to the client application operating on the second communication client device 116. The transmission of the communication may be according to any acceptable protocol through the network 112. For example, any communication hop or connection for an email communication can be by Simple Mail Transfer Protocol (SMTP), Local Mail Transfer Protocol (LMTP), Internet Message Access Protocol (IMAP), Post Office Protocol (POP), the like, or a combination thereof.

In some embodiments, communications are intercepted by the communication server module operating on the first communication server device 104, and copies of the non-privileged communications (e.g., communications without a privilege flag) are stored in a database. The database can be in the database device 106, in memory of the first communication server device 104, in memory of another device, or a combination thereof. The copies of the non-privileged communications can be used as an archive for subsequent investigations, data mining, or the like. The non-privileged communications can be used as evidence of illicit activities and can be used to identify individuals involved in illicit activities, for example. Further, new jargon that is used may be detected in non-privileged communications, and its meaning may be determined by analyzing the communications. In such embodiments, any privileged communications that are maintained on a server device (e.g., the first communication server device 104) corresponding to an account of the user may not be analyzed.

In some embodiments, a separate archive of the content of privileged and non-privileged communications is not created by intercepting and copying communications, although copies of non-privileged communications may be copied and stored in a database. In some embodiments, metadata, such as the sender, addressee(s), and time stamp of a communication may be stored in a database. Communications may be maintained in accounts on a server device for a user. For example, for email communications, the first communication server device 104 may maintain copies of the email communications for the user (e.g., a resident in the controlled-environment facility 110 that uses the first communication client device 102), such as in an inbox folder, a sent folder, other archive folder(s), or the like. These email communications on the first communication server device 104 may be used for analysis, such as in investigations, data mining, or the like, and a privilege flag can indicate when certain ones of the email communications are not to be analyzed. The privileged communications may be maintained in an encrypted format on the server device as an added level of security. Hence, the user may continue to access the communications without losing privilege.

Additionally, in some embodiments, the client application operating on the first communication client device 102 and the communication server module operating on the first communication server device 104 may each include a feature to delete cached, non-archival copies of a communication with a privilege flag. As stated above, in some communication modes, a communication may be maintained in a persistent state due to the nature of the communication mode. In some instances, a cached copy of the communication may be made at a device until the communication is successfully transmitted along the next hop of the communication connection. For non-privileged communications, the cached copy of the communication may not be deleted immediately after transmission and may simply be overwritten in the cache by subsequent communications in a normal course of operation. In some embodiments, for privileged communications, the cached copy is affirmatively deleted from the cache upon successful transmission of the communication along the next hop. This may allow for an added level of security because fewer copies of the communication may be available to lose privilege.

In other embodiments, privileged communications may be encrypted instead of being deleted. The encrypted privileged communications may be stored or saved to a special mailbox that provides access to these communications.

A specific example is provided in the context of an inmate in a prison (e.g., a user in the controlled-environment facility 110) communicating by sending an email to an attorney. Other communication modes, other classifications of recipients, and/or more or fewer features of the system are contemplated by other embodiments.

The inmate accesses his email account having an address inmate@facility.com using an email client application on the first communication client device 102, which can be a kiosk, a tablet, a computer, or the like. The inmate composes an email and addresses it to his attorney having an address attorney@biglaw.com. The attorney has registered the email address attorney@biglaw.com on the database on the database device 106, which was validated. Hence, the attorney may be able to communicate using the email address attorney@biglaw.com without losing privilege. Once the inmate has composed the email and entered the address, the inmate hits the "Send" button to indicate that the email is ready for transmission.

The email client application on the first communication client device 102 extracts the addresses of all of the recipients and sender of the email and transmits the addresses to an email server module operating on the first communication server device 104 through the network 112. In this instance, there is only one recipient address, attorney@biglaw.com. The email server module queries the database operating on the database device 106 to determine whether the address attorney@biglaw.com belongs to a registered user. Since the attorney is registered without reference to the sender address, the email server module determines that the email is privileged and transmits an indication to the email client application on the first communication client device 102 that the email is privileged.

Diverging from the example, if the inmate's brother, who is not a person that may communicate with the inmate under privilege, is also an addressee of the email by the address brother@family.com in addition to the attorney, the addition of brother@family.com would defeat the ability to claim privilege of the email. Hence, when the email server module receives attorney@biglaw.com and brother@family.com, attorney@biglaw.com would be indicated as registered, and brother@family.com would not be registered. Hence, the email server module would determine that the email is not privileged.

Diverging even further, if the inmate's spouse is also an addressee of the email by the address spouse@family.com in addition to the attorney, the addition of spouse@family.com may not defeat the ability to claim privilege of the email. The inmate's address inmate@facility.com would be sent to the email server module to determine whether spouse@family.com is registered as a spouse of inmate@facility.com. If spouse@family.com is registered, then the communication may be covered under privilege. Hence, when the email server module receives attorney@biglaw.com, spouse@family.com, and inmate@facility.com, the recipients attorney@biglaw.com and spouse@family.com would be indicated as registered. Hence, the email server module would determine that the email is privileged.

Returning to the example, when the email client application on the first communication client device 102 receives the indication that the email is privileged, the email client application encrypts the email, attaches a privilege flag to a header of the email, and transmits the encrypted and flagged email to the email server module on the first communication server device 104. The email client application may affirmatively delete any cached copies of the email on the first communication client device 102 (e.g., in memory) after the email client application receives an acknowledgement from the email server module of a successful transmission. If no indication that the email is privileged is received, the email client application would transmit the email without a privilege flag and without encrypting the content of the email.

The email server module may then record a separate copy of any non-privileged email, e.g., in the database operating on the database device 106, in a database in memory of the first communication server device 104, or the like. In this example, however, the email server module detects the presence of the privilege flag attached to the header of the email, and the email server module does not record a separate copy of the privileged email. The email server module may record metadata of the email in a database. The email server module may maintain a copy of the privileged email on the first communication server device 104 in an account of the inmate so that the inmate may later access the privileged email. The privileged email may be maintained in its flagged and encrypted form to prevent subsequent analysis of the email.

The email server module on the first communication server device 104 then transmits the email to the email server module on the second communication server device 114 through the network 112. The email server module on the first communication server device 104 may affirmatively delete any cached copies of the email on the first communication server device 104 (e.g., in memory) after the email server module receives an acknowledgement from a subsequent device (e.g., the second communication server device 114 or an intermediate server) of a successful transmission. The email server module on the second communication server device 114 then transmits through the network 112 the email to the email client application on the second communication client device 116, where the attorney receives the email.

In some situations, an operator of a controlled-environment facility like the controlled-environment facility 110 of FIG. 1 controls communications between a resident, such as an inmate, and another person. In some communication systems implemented by such an operator, non-privileged communications occurring at, originating from, or received at the controlled-environment are recorded for, e.g., investigations, data mining, or the like. Since the operator of the controlled-environment facility controls the communication systems, implementing communication systems to record communications occurring at, originating from, or received at the controlled-environment facility may be unilaterally performed by the operator. Hence, some embodiments may achieve protection for some communications to maintain a privilege designation in a communication system implemented by such an operator. However, beyond the systems that the operator controls, privilege of a given communication may be maintained, or lost, as a result of actions of the other person that is a party to the communication and/or the other person's service provider, for example, which may be independent from the operator of the controlled-environment facility.

Turning now to FIG. 2 when a communication is to be received, in step 202, communication content and a communication addressee(s) and/or sender are provided for a communication via a communication mode. In the context of FIG. 1, the communication content and a communication addressee(s) and sender can be provided in a communication that originated outside of the client-server architecture (e.g., the first communication client device 102 and the first communication server device 104) in the controlled-environment facility 110. For example, a communication can be generated at the client application on the second communication client device 116, transmitted through the network 112 to the communication server module on the second communication server device 114, and transmitted through the network 112 to the communication server module on the first communication server device 104. The communication may be flagged as privileged as received (such as when sent in response to a previously transmitted privileged communication) or not flagged. The communication is sent with, for example, header information including the sender and addressee(s). Once the communication is received at the communication server module on the first communication server device 104, the communication server module extracts the sender and addressee(s) from the communication, such as from the header information of the communication.

In step 204, the addressee(s) and/or sender are compared to registered users in a database. The comparison may be in reference to each addressee of the communication to which a communication server device provides communication service. For example, in an email communication, an email is received at an email server from sender@send.com and is addressed to first@receive.com, second@receive.com, and third@whatever.com. The email server that received the email provides service for the domain receive.com. Hence, the email server would analyze sender@send.com, second@receive.com, and third@whatever.com for the email to be sent to first@receive.com (which may be performed in reference to first@receive.com, such as for a potential spouse), and the email server would analyze sender@send.com, first@receive.com, and third@whatever.com for the email to be sent to second@receive.com (which may be performed in reference to second@receive.com, such as for a potential spouse). The email server may not analyze addresses for the email to be sent to third@whatever.com since the email server does not service the domain whatever.com.

In the context of FIG. 1, the communication server module queries the database operating on the database device 106, e.g., through the network 112, to determine whether the sender and any addressee(s) other than the individual to whom the communication is to be delivered are registered users on the database.

In step 206, the communication is flagged as privileged when the addressee(s) and/or sender are registered users in the database. A flag can be attached to the communication as header information, for example, when the communication is privileged. In the context of FIG. 1, in some embodiments, if all of the sender and other addressee(s) are registered, the communication server module flags the communication as privileged. In some embodiments, if not all of the sender and other addressee(s) are registered, the communication is not flagged as privileged.

In step 208, the communication content is encrypted when the sender and/or addressee(s) are registered users in the database. In the context of FIG. 1, when the communication server module on the first communication server device 104 determines that the communication is privileged, the communication server module encrypts the content of the communication for additional security. The encryption may be by using, for example, PGP protocol, Bitmessage protocol, S/MIME protocol, or the like. The content of the communication may be encrypted while header information of the message, including any flag, may in some instances not be encrypted. In some embodiments, encryption may be omitted.

In step 210, the communication is then transmitted via the communication mode. In the context of FIG. 1, the communication is transmitted from the communication server module operating on the first communication server device 104 to the client application operating on the first communication client device 102 through the network 112. The transmission of the communication may be according to any acceptable protocol. For example, any communication hop or connection for an email communication can be by SMTP, LMTP, IMAP, POP, the like, or a combination thereof.

In some embodiments, communications are intercepted by the communication server module operating on the first communication server device 104, such as after analyzing the communications for privilege, and copies of the non-privileged communications (e.g., communications without a privilege flag) are stored in a database. The database can be in the database of the database device 106, in memory of the first communication server device 104, in memory of another device, or a combination thereof. The copies of the non-privileged communications can be used as an archive for subsequent investigations, data mining, or the like. The non-privileged communications can be used as evidence of illicit activities and can be used to identify individuals involved in illicit activities, for example. Further, new jargon that is used may be detected in non-privileged communications, and its meaning may be determined by analyzing the communications. In such embodiments, any privileged communications that are maintained on a server device (e.g., the first communication server device 104) corresponding to an account of the user may not be analyzed.

In some embodiments, a separate archive of the content of privileged and non-privileged communications is not created by intercepting and copying communications, although copies of non-privileged communications may be copied and stored in a database. In some embodiments, metadata, such as the sender, addressee(s), and time stamp of a communication may be stored in a database. Communications may be maintained in accounts on a server device for a user. For example, for email communications, the first communication server device 104 may maintain copies of the email communications for the user (e.g., a resident in the controlled-environment facility 110 that uses the first communication client device 102), such as in an inbox folder, a sent folder, other archive folder(s), or the like. These email communications on the first communication server device 104 may be used for analysis, such as in investigations, data mining, or the like, and a privilege flag can indicate when certain ones of the email communications are not to be analyzed. The privileged communications may be maintained in an encrypted format on the server device as an added level of security. Hence, the user may continue to access the communications without losing privilege.

Additionally, in some embodiments, the client application operating on the first communication client device 102 and the communication server module operating on the first communication server device 104 may each include a feature to delete cached, non-archival copies of a communication with a privilege flag. As stated above, in some communication modes, a communication may be maintained in a persistent state due to the nature of the communication mode. In some instances, a cached copy of the communication may be made at a device until the communication is successfully transmitted along the next hop of the communication connection. For non-privileged communications, the cached copy of the communication may not be deleted immediately after transmission and may simply be overwritten in the cache by subsequent communications in a normal course of operation. In some embodiments, for privileged communications, the cached copy is affirmatively deleted from the cache upon successful transmission of the communication along the next hop. This may allow for an added level of security because fewer copies of the communication may be available to lose privilege.

A specific example is provided in the context of an inmate in a prison (e.g., a user in the controlled-environment facility 110) communicating by receiving an email from an attorney. Other communication modes, other classifications of recipients, and/or more or fewer features of the system are contemplated by other embodiments.

The attorney accesses her account of attorney@biglaw.com using an email client application on the second communication client device 116, which can be a computer, a tablet, or the like. The attorney composes an email and addresses it to her inmate client at inmate@facility.com. The attorney has registered her email address attorney@biglaw.com on the database on the database device 106, which was validated. Hence, the attorney may be able to communicate using the email address attorney@biglaw.com without losing privilege. The attorney then sends the email from the email client application on the second communication client device 116 to the email server module on the second communication server device 114 through the network 112. The email server module on the second communication server device 114 sends the email to the email server module on the first communication server device 104 through the network 112. In this example, the email is not encrypted as sent.

The email server module on the first communication server device 104 then extracts the sender and addressee from the header information of the email. The email server module determines to which recipient addresses the email is to be delivered on the email server module's domain (e.g., facility.com). For each recipient address to which the email is to be delivered on that domain, the email server module determines whether the sender and all other recipient addresses are registered such that the email should be flagged as privileged. For each recipient address on that domain (here just inmate@facility.com), the email server module queries the database operating on the database device 106 to determine whether the sender and any other addressees, which in this example is just the address attorney@biglaw.com, belongs to a registered user. Since the attorney is registered, the email server module determines that the email is privileged. The email server module then attaches a privilege flag to the email.

Diverging from the example, if the inmate's brother, who is not a person that may communicate with the inmate under privilege, is also an addressee of the email by brother@family.com in addition to the inmate, the addition of brother@family.com would defeat the ability to claim privilege of the email. Hence, when the email server module receives attorney@biglaw.com and brother@family.com, attorney@biglaw.com would be indicated as registered, and brother@family.com would not be registered. Hence, the email server module would determine that the email is not privileged.

Diverging even further from the example, if a second inmate of the jail or prison, who is not a person that may communicate with the inmate under privilege, is also an addressee of the email by secondinmate@facility.com in addition to the inmate at inmate@facility.com, the addition of the secondinmate@facility.com would defeat the ability to claim privilege of the email. The email server module in this example services the domain facility.com. The email server module would analyze, for the email sent to inmate@facility.com, whether attorney@biglaw.com and secondinmate@facility.com are registered. Since secondinmate@facility.com is not registered, the email to inmate@facility.com would not be privileged. A similar process and analysis would occur for the email to be sent to secondinmate@facility.com.

In one embodiment, when there is a third party involved and the communication is not privileged, the system notifies the participants of this fact (i.e., that both potentially privileged and non-privileged recipients are listed). For outgoing communications, the system may ask the sender whether he or she wants to continue to send the communication anyway (e.g., require some acknowledgement that the communication will not be privileged due to the inclusion of non-privileged recipients). Additionally, there may be further indications to both parties when a communication is privileged.

A communication drafting application, such as a text or email composition function, may include a directory of privileged recipients, such as attorneys, clergy, etc. The communication sender may select a recipient from this directory—such as by using a dropdown menu or a pop-up listing of the privileged recipient directory. The sender may select a new or an already retained attorney from the directory, which may be, for example, a listing of attorneys licensed to practice within the state or admitted to practice before a particular court. The directory may list various types of contact information for the privileged recipients, such as email addresses, SMS text address, instant messaging identifier, telephone number, etc. In one embodiment, the service provider operating the communication system may charge a fee for the privileged recipients (e.g., attorneys) to be included in the directory.

Returning to the example, when the email server module on the first communication server device 104 determines that the email is privileged, the email server module encrypts the email, attaches a privilege flag to a header of the email, and transmits the encrypted and flagged email to the email client application on the first communication client device 102 through the network 112. If the email is not privileged, the email is not flagged and is not encrypted. The email server module may record a separate copy of any non-privileged email, e.g., in the database operating on the database device 106, in a database in memory of the first communication server device 104, or the like. In this example, however, the email server module does not record a separate copy of the privileged email because the email has been flagged as privileged. In some instances, the email server module may record metadata from the privileged email in a database. The email server module may maintain a copy of the privileged email on the first communication server device 104 in an account of the inmate so that the inmate may later access the privileged email. The privileged email may be maintained in its flagged and encrypted form to prevent subsequent analysis of the email.

The email server module on the first communication server device 104 may affirmatively delete any cached copies of the email on the first communication server device 104 (e.g., in memory) after the email server module performs processing and/or receives an acknowledgement from a subsequent device (e.g., the first communication client device 102 or an intermediate server) of a successful transmission. The email client application may affirmatively delete any cached copies of the email on the first communication client device 102 (e.g., in memory) after the email client application accesses the email from the email server module. Alternatively, in another embodiment, the system may not immediately delete the privileged communication but may instead store the communication in a separate mailbox. The separate mailbox may be accessible only to the inmate and/or the saved privileged communication may be encrypted to prevent unauthorized access to the communication.

In addition to identifying and protecting privileged text-based communications, the system could also be used to protect other forms of electronic communication, such as video visitation. An inmate may communicate with his or her attorney using a video visitation application, such as a video client running on communication clients 102 and 116. The originating and terminating addresses for the video visitation session may be extracted by the video client application on the initiating or receiving communication client device 102. The originating and terminating addresses for all of the recipients and the sender are used to query the database operating on the database device 106 to determine whether the addresses belong to a registered user or a known privileged party. If one of the parties is an attorney, for example, and the other party is an inmate, then the video visitation session will not be saved and its content will not be analyzed. For other video visitation sessions including non-privileged parties, the content may be saved and analyzed by investigators. In other embodiments, privileged video communications may be encrypted. The encrypted privileged video communications may be stored or saved to a special mailbox that provides access to these communications.

Some embodiments may provide for a mechanism for users to communicate using various communication modes without losing privilege of the communication. This may encourage people who otherwise would not use those communication modes to begin using those communication modes. This could allow for easier and more efficient communications.

An example embodiment is a method comprising the steps of: using at least one processor of a communication server device, receiving addressee information of one or more addressee of a communication, sender information of a sender of the communication, or a combination thereof, wherein the communication is to be transmitted by a communication mode, the communication mode involving content of the communication being kept in a persistent state at a device due to a nature of the communication mode; comparing the sender information, the addressee information, or a combination thereof to registered user information maintained in a database, the registered user information corresponding to registered users to or from whom privileged communications may be sent or received; and providing an indication that the communication is privileged when the sender information, the addressee information, or the combination thereof corresponds to respective registered user information maintained in the database. Providing the indication that the communication is privileged may comprise transmitting the indication to a communication client device.

The method may further comprise, using the at least one processor of the communication server device, to receive the communication, a privilege flag being attached to the communication as received when the indication was provided. The communication may include encrypted communication content as received when the indication was provided. The method may further comprise, using the at least one processor of the communication server device, to attach a privilege flag to the communication in response to the indication being provided. The method may further comprise, using the at least one processor of the communication server device, to encrypt communication content of the communication in response to the indication being provided. The method may further comprise recording an archival copy of the communication independent from the communication mode when no indication that the communication is privileged was provided and preventing recording the archival copy when a privileged indication was provided.

The communication mode may be email, Short Message Service (SMS) text, direct message, instant messaging, or a combination thereof.

In another embodiment, a system comprises a database device having a database stored in non-transitory memory, the database maintaining registered user information of registered users to whom a privileged communication can be sent; a communication client device running a client application operable to generate an originating communication comprising first sender information and first addressee information; and a communication server device having a server module operable to receive the first addressee information, query the database, and compare the first addressee information to the registered user information, the server module being operable to send an indication to the client application that the originating communication is privileged when the first addressee information corresponds to respective registered user information in the database, the client application further being operable to attach a first privilege flag to the originating communication in response to receiving the indication and to transmit the originating communication with the first privilege flag.

The client application may be further operable to encrypt the first content into encrypted content and to transmit the originating communication comprising the encrypted content.

The server module may be operable to store an archival copy of the communication independent from the communication mode when no indication that the originating communication is privileged was provided and preventing recording the archival copy when a privileged indication was provided. The server module may be operable to receive an incoming communication comprising sender information, second addressee information, and second content, the server module being operable to query the database, and compare the sender information and the second addressee information to the registered user information, and the server module being operable to attach a second privilege flag to the incoming communication when the sender information and the second addressee information correspond to respective registered user information in the database. The server module may be operable to encrypt the second content to be encrypted content when the sender information and the second addressee information correspond to registered user information in the database. The server module may be operable to store an archival copy of the incoming communication when the sender information and the second addressee information, excluding the recipient addressee information, does not correspond to respective registered user information in the database, wherein the server module is operable to not store an archival copy of the incoming communication when the sender information and the second addressee information, excluding the recipient addressee information, correspond to the respective registered user information in the database.

In another embodiment, a non-transitory computer-readable storage medium has a computer program embodied thereon, the computer program comprises program code instructions for receiving first addressee information of an originating communication from a client application; program code instructions for comparing the first addressee information to registered user information in a database, the registered user information corresponding to registered users with whom communication may be privileged; program code instructions for transmitting an indication that the originating communication is privileged to the client application when the first addressee information corresponds to respective registered user information in the database; and program code instructions for receiving the originating communication from the client application, the originating communication having a first privilege flag in response to the indication. The originating communication may include encrypted content when received. The non-transitory computer-readable storage medium may be any appropriate electronic storage device, memory, RAM, SRAM, SDRAM, nonvolatile memory, or Flash memory, for example.

The computer program may further comprise program code instructions for storing an archival copy of the originating communication when the originating communication does not have the first privilege flag, wherein no archival copy of the originating communication is stored when the originating communication has the first privilege flag. The computer program may further comprise program code instructions for receiving an incoming communication, the incoming communication comprising sender information, second addressee information, and second content; program code instructions for comparing the sender information and the second addressee information, excluding recipient address information corresponding to the client application, to the registered user information in the database; program code instructions for attaching a second privilege flag to the incoming communication when the sender information and the second addressee information correspond to respective registered user information in the database; and program code for transmitting the incoming communication to the client application, the incoming communication having the second privilege flag when the sender information and the second addressee information correspond to respective registered user information in the database.

The computer program may further comprise program code instructions for encrypting the second content when the sender information and the second addressee information, excluding recipient address information corresponding to the client application, correspond to respective registered user information in the database. The computer program may further comprise program code instructions for storing an archival copy of the incoming communication when the incoming communication does not have the second privilege flag, wherein no archival copy of the incoming communication is stored when the incoming communication has the second privilege flag.

Although some embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   using at least one processor of a communication server device:
   receiving addressee information of one or more addressee of a communication, sender information of a sender of the communication, or a combination thereof, wherein the communication is to be transmitted by a communication mode;
   comparing the sender information, the addressee information, or a combination thereof to registered user information maintained in a database, the registered user information corresponding to registered users that may send and receive privileged communications; and
   providing an indication that the communication is privileged when the sender information, the addressee information, or the combination thereof corresponds to registered user information maintained in the database;
   sending the indication to a client application that the communication is privileged, the client application operable to attach a privilege flag to the communication in response to receiving the indication and to transmit the communication with the privilege flag.

2. The method of claim 1 further comprising, using the at least one processor of the communication server device, receiving the communication, the privilege flag being attached to the communication.

3. The method of claim 2 further comprising, wherein the client application is further operable to encrypt the communication in response to the privilege indication by the communication server.

4. The method of claim 1, further comprising receiving the communication from the client application, wherein the communication includes additional addressee information.

5. The method of claim 4 further comprising, using the at least one processor of the communication server device, attaching an additional privilege flag to the communication in response to determining the additional addressee information corresponds to registered user information maintained in the database.

6. The method of claim 5 further comprising, using the at least one processor of the communication server device, encrypting the communication content of the communication in response to determining the additional addressee information corresponds to registered user information maintained in the database.

7. The method of claim 1 further comprising recording an archival copy of the communication when no privilege flag is attached to the communication and not recording the archival copy when a privileged flag is attached to the communication.

8. The method of claim 1, wherein the communication mode is email, Short Message Service (SMS) text, direct message, instant messaging, or a combination thereof.

9. A system comprising:
   a database device having a database stored in non-transitory memory, the database maintaining registered user information of registered users to whom a privileged communication can be sent;
   a communication client device running a client application operable to generate an originating communication comprising first sender information and first addressee information; and
   a communication server device having a server module operable to receive the first addressee information, query the database, and compare the first addressee information to the registered user information, the server module being operable to send an indication to the client application that the originating communication is privileged when the first addressee information corresponds to respective registered user information in the database, the client application further being operable to attach a first privilege flag to the originating communication in response to receiving the indication and to transmit the originating communication with the first privilege flag.

10. The system of claim 9, wherein the client application is further operable to encrypt the first content into encrypted content and to transmit the originating communication comprising the encrypted content.

11. The system of claim 9, wherein the server module is operable to store an archival copy of the communication independent from the communication mode when no indication that the originating communication is privileged was provided and preventing recording the archival copy when a privileged indication was provided.

12. The system of claim 9, wherein the server module is operable to receive an incoming communication comprising sender information, second addressee information, and second content, the server module being operable to query the database, and compare the sender information and the second addressee information to the registered user information, and the server module being operable to attach a second privilege flag to the incoming communication when the sender information and the second addressee information correspond to respective registered user information in the database.

13. The system of claim 12, wherein the server module is operable to encrypt the second content to be encrypted content when the sender information and the second addressee information correspond to registered user information in the database.

14. The system of claim 12, wherein the server module is operable to store an archival copy of the incoming communication when the sender information and the second addressee information, excluding the recipient addressee information, does not correspond to respective registered user information in the database, wherein the server module is operable to not store an archival copy of the incoming communication when the sender information and the second addressee information, excluding the recipient addressee information, correspond to the respective registered user information in the database.

15. A non-transitory computer-readable storage medium having a computer program embodied thereon, the computer program comprising:
   program code instructions for receiving first addressee information of an originating communication from a client application;
   program code instructions for comparing the first addressee information to registered user information in a database, the registered user information corresponding to registered users with whom communication may be privileged;
   program code instructions for transmitting an indication that the originating communication is privileged to the client application when the first addressee information corresponds to respective registered user information in the database; and
   program code instructions for receiving the originating communication from the client application, the originating communication having a first privilege flag in response to the indication.

16. The non-transitory computer-readable storage medium of claim 15, wherein the originating communication includes encrypted content when received.

17. The non-transitory computer-readable storage medium of claim 15, wherein the computer program further comprises program code instructions for storing an archival copy of the originating communication when the originating communication does not have the first privilege flag, wherein no archival copy of the originating communication is stored when the originating communication has the first privilege flag.

18. The non-transitory computer-readable storage medium of claim 15, wherein the computer program further comprises:
   program code instructions for receiving an incoming communication, the incoming communication comprising sender information, second addressee information, and second content;
   program code instructions for comparing the sender information and the second addressee information, excluding recipient address information corresponding to the client application, to the registered user information in the database;
   program code instructions for attaching a second privilege flag to the incoming communication when the sender information and the second addressee information correspond to respective registered user information in the database; and
   program code for transmitting the incoming communication to the client application, the incoming communication having the second privilege flag when the sender information and the second addressee information correspond to respective registered user information in the database.

19. The non-transitory computer-readable storage medium of claim 18, wherein the computer program further comprises program code instructions for encrypting the second content when the sender information and the second addressee information, excluding recipient address information corresponding to the client application, correspond to respective registered user information in the database.

20. The non-transitory computer-readable storage medium of claim 18, wherein the computer program further comprises program code instructions for storing an archival copy of the incoming communication when the incoming communication does not have the second privilege flag, wherein no archival copy of the incoming communication is stored when the incoming communication has the second privilege flag.

* * * * *